United States Patent [19]

Bates

[11] 3,885,138

[45] May 20, 1975

[54] ULTRA LINEAR FREQUENCY SWEEP GENERATOR

[75] Inventor: Norman F. Bates, Dana Point, Calif.

[73] Assignee: The United States of America as represented by the Secretary of the Navy, Washington, D.C.

[22] Filed: July 18, 1974

[21] Appl. No.: 489,683

[52] U.S. Cl. ............ 235/150.53; 307/271; 328/15; 331/178

[51] Int. Cl. ............ H03b 23/00

[58] Field of Search ............ 235/150.53, 197, 150.3, 235/92 FQ; 331/4, 178; 307/228, 232, 233, 271; 328/14, 15, 181, 187, 27, 133, 155

[56] References Cited

UNITED STATES PATENTS

| | | | |
|---|---|---|---|
| 3,530,404 | 9/1970 | Abruzzo et al. | 331/178 |
| 3,597,699 | 8/1971 | Seipel | 331/178 X |
| 3,739,374 | 6/1973 | Kiowski | 235/197 X |
| 3,792,378 | 2/1974 | Hughes et al. | 331/178 |

*Primary Examiner*—Joseph F. Ruggiero
*Attorney, Agent, or Firm*—R. S. Sciascia; Henry Hansen

[57] ABSTRACT

A sweep frequency generator produces a baseband frequency decreasing linearly from 6.4 KHz to OHz in 16 seconds. After the sixteen second period, the generator reverts to 6.4 KHz and the sweep is repeated until stopped. The ramp sweep is derived by dividing the output of a crystal oscillator in a modulo $N_1$ counter to produce a frequency 6400.0625 Hz which is used to reset a coincidence flip-flop; the output of the crystal oscillator is also divided in a modulo $N_2$ counter to produce a frequency 6400 Hz which is used to set the coincidence flip-flop. The frequencies derived from the two mod n counters are phase coincident at sixteen second intervals. The output of the coincidence flip-flop gates pulses from the crystal oscillator to a divider whose output represents the baseband signal. An additional feature of the design is the implementation of logic to provide synthesized frequencies at 0.83 Hz steps throughout the ramp frequency spectrum. A further feature includes means by which the square wave baseband may be converted to a sinusoid.

17 Claims, 12 Drawing Figures

ULTRA LINEAR FREQUENCY SWEEP GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to variable frequency generators and more particularly to variable frequency ramp generators wherein the ramp frequencies are synthesized with digital logic.

Conventional sweep methods using a VCO and linear sweep suffer from inherent inaccuracies. A first order approximation of such methods would result in a linearity of no better than 0.5%. Other conventional methods of fine resolution digital synthesis do not lend themselves to linear sweep applications because devices made according to those methods are generally digitally programmed and as such are not time dependent in linearity.

SUMMARY OF THE INVENTION

Accordingly, it is an object of this invention to provide a frequency ramp generator wherein all timing signals are derived from a single crystal oscillator. It is a further object of this invention to provide a frequency ramp generator with a frequency linearity of not more than one cycle deviation from the ideal slope at any point in the frequency spectrum of the ramp. It is a further object of this invention to provide a ramp generator wherein frequency standards and time standards are derived with digital logic.

Briefly these and other objects are accomplished as follows. The ultra linear frequency ramp generator provides a 16 second sweep from 6.4 KHz to 0Hz with provision for a reverse sweep from 0Hz to 6.4 KHz. The sweep is designed for a frequency linearity of not more than one cycle deviation from the ideal slope at any point in the frequency spectrum of the ramp. The ramp sweep time and the frequency slope are derived from a single crystal oscillator operating at a nominal frequency of 49,152,480 Hz.

The crystal standard is divided by a modulo $n_1$ counter to provide a frequency of 6400.0625 Hz. The 49,152,480 Hz. is also divided by a module $n_2$ counter to provide a frequency of 6400.0000 Hz. The frequencies derived from the two module $n$ counters are phase coincident at sixteen second intervals.

The ramp frequency is derived by resetting a flip-flop with the rising edge of the 6400.0625 Hz. output and setting the flip-flop with the rising edge of the 6400.0000 Hz. output.

If the output of the flip-flop is gated with a high frequency signal, the number of cycles of the high frequency signal appearing in each gate period will vary with the mark-to-space pattern of the flip-flop. If the high frequency pulses are divided by a suitable factor, a base-band frequency of 6.4 KHz representing the longest mark period of the flip-flop is produced. The base-band frequency will decrease linearly until the next in-phase period when the base-band frequency will revert to 6.4 KHz. A sawtooth ramp is thus obtained, sweeping from 6.4 KHz to 0Hz. The base band output is a square wave which represents a clipped sinusoid in the sense that the period of the square wave is equivalent in time to the zero crossing points in the sinusoid.

Other objects, advantages and novel features of the invention will become apparent from the following detailed description of the invention when considered in conjunction with the accompanying drawings.

DESCRIPTION OF THE PREFERRED EMBODIMENT

Figure 1:
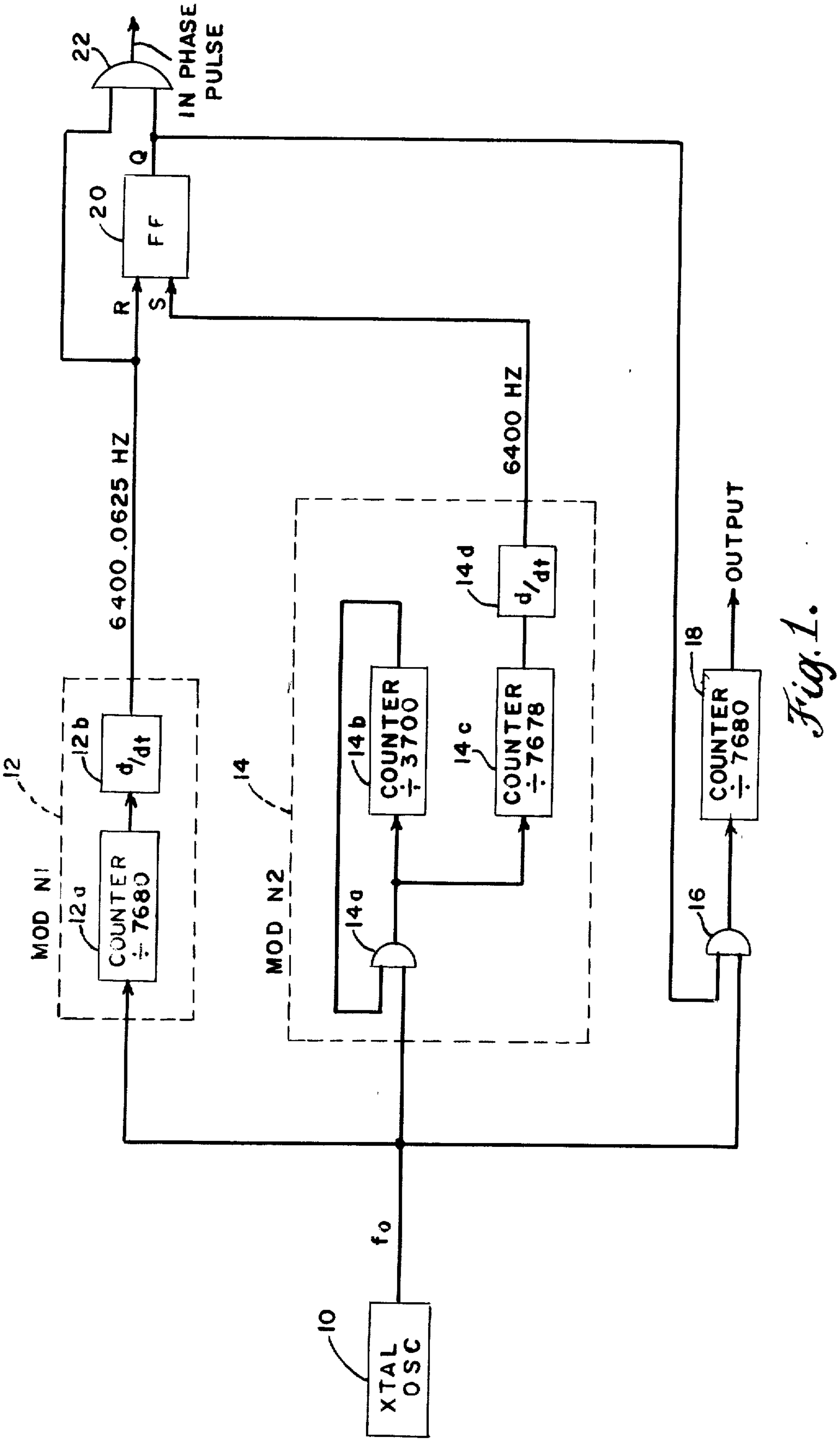
FIG. 1 is a block diagram of an embodiment of an ultra linear frequency ramp generator according to the invention.

Referring to FIG. 1, a crystal oscillator 10 produces a frequency $f_o$ of 49,152,480 Hz; $f_o$ is divided by a modulo $n_1$ divider 12 to provide a frequency of 6,400.0625 Hz. Divider 12 includes a counter 12*a* which divides its input by 7,680 to derive 6400.0625 Hz. Divider 12 includes a counter 12*a* which divides its input by 7,680 to derive 6400.0625 Hz. Divider 12 also includes a differentiator 12*b* which differentiates the output of counter 12*a* and clips the negative pulses. The output of divider 12 is used to reset a flip-flop 20. The oscillator 10 output $f_o$ is also provided to a modulo $n_2$ divider 14 which produces 6,400 Hz at its output. In order to obtain 6,400 Hz, $f_o$ is first divided by 3,700 in counter 14*b*. The output of counter 14*b* deletes a pulse in gate 14*a*. The division is therefore effectively 3,701 and the output frequency of counter 14*b* is 13,280 Hz. The output from gate 14*a* is 49,152,480 Hz. less 13,280 Hz. which is 49,139,200 Hz. This is divided by 7,678 in counter 14*c* to provide 6,400 Hz. Differentiator 14*d* differentiates the output of counter 14*c* and clips the negative pulses. The output of divider 14 is used to set flip-flop 20. The two frequencies derived from dividers 12 and 14 are phase coincident at sixteen second intervals.

The output of flip-flop 20 (hereinafter called the coincidence flip-flop) is gated with the output of oscillator 10 in gate 16 and divided by 7,680 in counter 18 to provide a maximum ramp frequency of 6,400.0625 Hz. A pulse which indicates the in-phase time of the set and reset frequencies of coincidence flip-flop 20 and thus the start of the ramp is generated at the output of gate 22 by gating the differentiated output of divider 12 and the Q output of coincidence flip-flop 20.

Figures 2A, 2B:
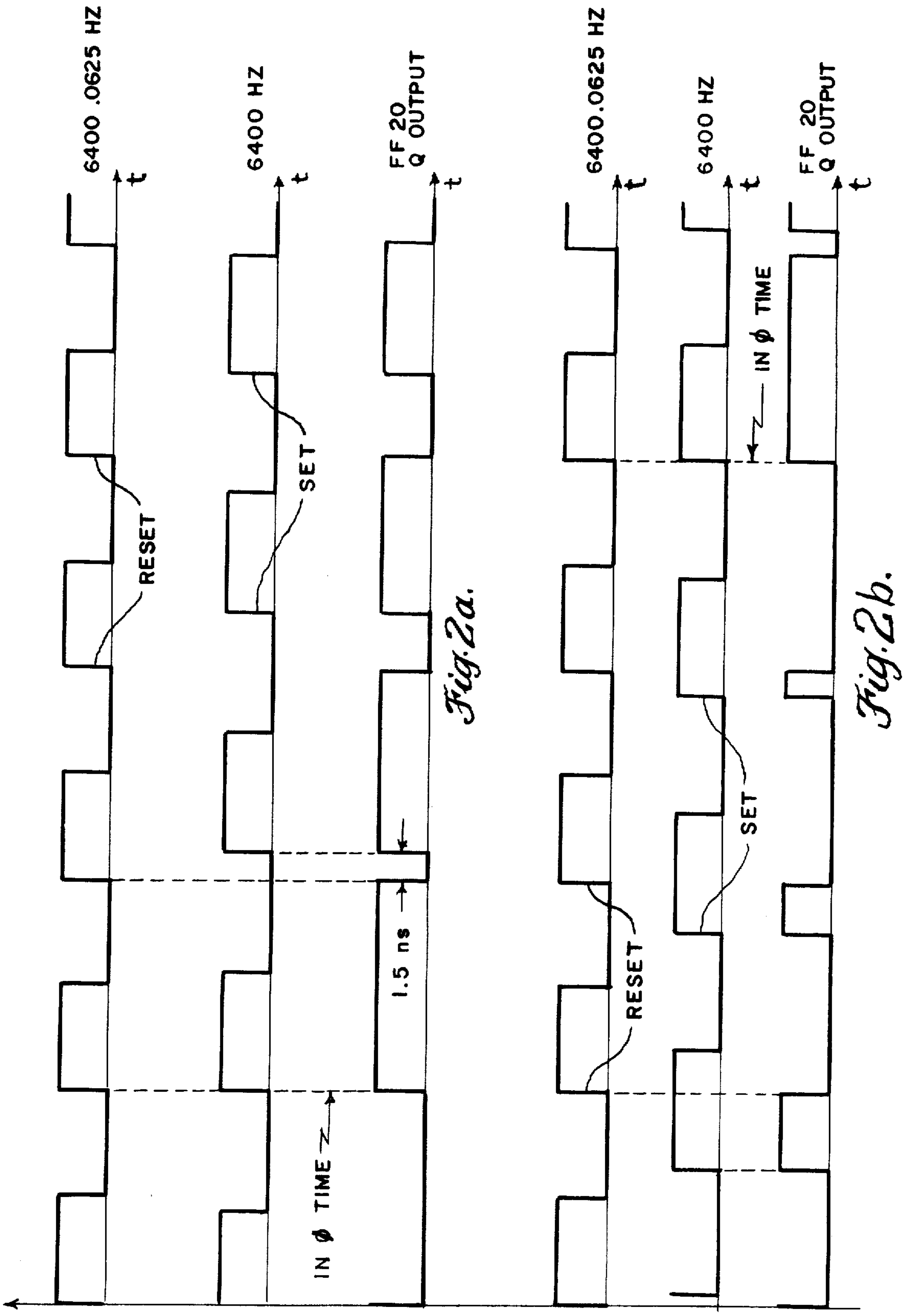
FIGS. 2*a*, 2*b*, 2*c* and 3 are typical timing diagrams applicable to portions of the ramp generator shown in FIG. 1.

The output sweep frequency or base-band is derived by resetting coincidence flip-flop 20 with the rising edge of the 6,400.0625 Hz. output of divider 12 and setting flip-flop 20 with the rising edge of the 6,400 Hz. output of divider 14. The output of coincidence flip-flip 20 is illustrated in FIG. 2*a* and 2*b*. FIG. 2*a* shows the output of flip-flop 20 at the phase coincident time and for a short time interval thereafter. The flip-flop output has a variable mark-to-space ratio with its longest space period prior to the in-phase time, and its longest mark period following the in-phase time. FIG. 2*b* shows the output of flip-flop 20 just prior to the next in-phase period. It is apparent from FIGS. 2*a* and 2*b* that when the two frequencies produced by dividers 12 and 14 are out of phase flip-flop 20 exhibits an equal mark-to-space ratio; thereafter the mark-to-space ratio decreases to a minimum value and, at the next phase coincident time, the mark-to-space ratio reverts to a maximum value.

It is apparent that when the output of coincidence flip-flop 20 is gated with the oscillator 10 frequency $f_o$ in gate 16, the number of cycles of $f_o$ appearing in each gate period will vary with the mark-to-space ratio of coincidence flip-flop 20. When the output of gate 16 is divided by a suitable factor (such as 7,680 in counter 18) a base-band frequency of 6,400 Hz is obtained as when the mark-to-space ratio of flip-flop 20 is at its maximum. Thereafter the base-band frequency decreases linearly until the next in-phase period at which time the base-band frequency reverts to 6,400 Hz. In this manner a sawtooth ramp is obtained sweeping from 6.4 KHz to 0 KHz in 16 seconds. The base-band output is a squarewave which reprea clipped sinusoid in the sense that the period of the squarewave is equivalent in time to the zero crossing points in the sinusoid.

Figure 2C:
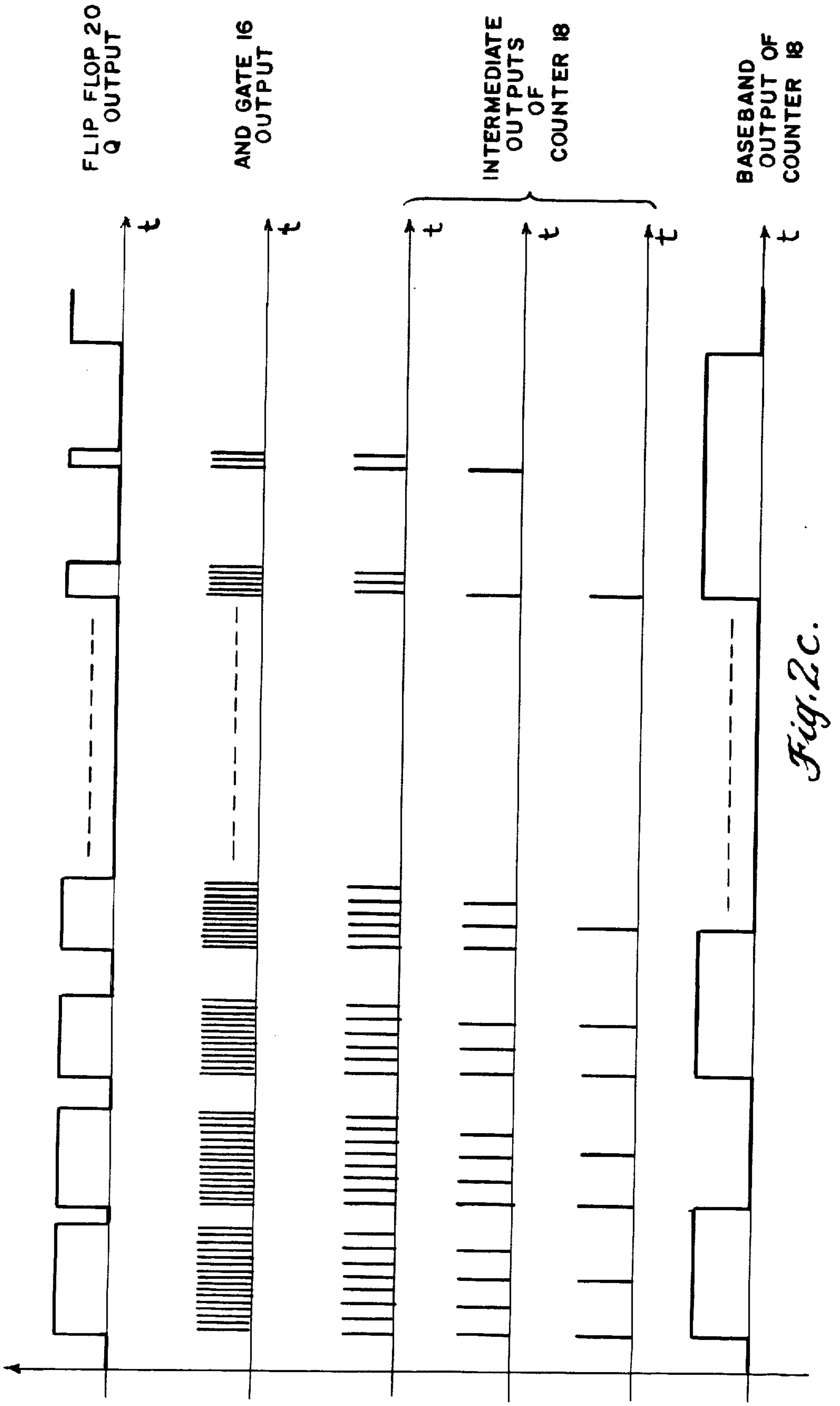

Referring to FIGS. 2*a*, 2*b* and 2*c*, where FIG. 2*c* represents a simplified count sequence and final base-band output of counter 18, it is apparent that the first space period of the Q output of flip-flop 20 is 1.5 ns wide which is equivalent to $$\frac{1}{6.4\text{KHz}} - \frac{1}{6.4000625\text{KHz}}$$

If it is within the practical limits of implementation to gate a high frequency signal with a 1.5 nanosec gate, an ideal frequency ramp can be generated for a square wave base-band frequency representing a clipped sinusoid. The frequency standard would be 666 MHz. It is possible to accomplish this by using high speed devices such as Schottky barrier diodes or tunnel diodes for the gating and high frequency section of the sequence counting. However for a ramp linearity which is to be held to within 1 Hz. of the ideal frequency spectrum, the sweep generator of the present invention may be implemented with standard digital integrated circuits. Commercially available flip-flops with a toggle speed of 50 MHz may be utilized which will resolve a gating period of 20 nanoseconds in the base-band sequence counting.

Assuming for the moment that the sweep generator of FIG. 1 were provided with a 50 MHz clock, the following observations are made.

With further reference to FIGS. 2*a*, 2*b* and 2*c* a gate period of 20 nanoseconds will occur after 13 periods of 6.4 KHz from the in-phase time of the input frequencies 6,400 Hz and 6400.0625 Hz. The elapsed time from the in-phase time is (156.25$\mu$ secs × 13) which is 2.03125 milliseconds. The frequency change of an ideal sweep frequency generator at this time would be (400 Hz/sec) × (2.03125 ms) or 0.8125 Hz. The instantaneous frequency is therefore (6,400–0.8125 Hz) or 6399.1875 Hz. It is apparent from an inspection of FIGS. 2*a*, 2*b* and 2*c* that the period of the sequence count for counter 18 remains constant from time $t_o$ of the slope to 2.03 milliseconds, at which time its period increases by 20 nanoseconds. The maximum deviation from the ideal slope during this period is 0.8125 Hz. When 1 cycle of the 50 MHz frequency is gated and deleted from the sequence count, the base-band frequency period is increased by 20 nanoseconds. The base-band frequency is now 1/156.25$\mu$ secs + 20 nanosecs or 6399.1875 Hz, which is equal to the instantaneous frequency of the ideal slope. The period of the base-band frequency increases by 20 nanoseconds at each 2.03 milliseconds of sweep, thus quantizing to the instantaneous frequency of an ideal ramp at every 2.03 milliseconds of the sweep. The number of quantizations is 16 seconds/2.03 millisecs or 7,783.

However it was convenient in the implementation of the sweep generator shown in FIG. 1 to utilize the same crystal standard to generate the sweep frequencies as is used to generate the offset frequencies of 6400.0000 Hz and 6400.0625 Hz. It is apparent from FIGS. 2*a*, 2*b* and 2*c* that immediately following the in-phase time of the coincident flip-flop, for a period of 156.25 $\mu$sec, the output of the high frequency gate 16 is 49,152,480 Hz. This signal is divided by a counter to produce the maximum ramp frequency (6.4 KHz). The frequency count is 49,152,480/6,400 or 7,680. The frequency quantization is therefore 7,680 frequency steps and the maximum deviation from an ideal slope is 6,400/7,680 or 0.833 Hz. rather than 0.8125 Hz. as would be the case had a 50 MHz clock been used.

Figure 3:
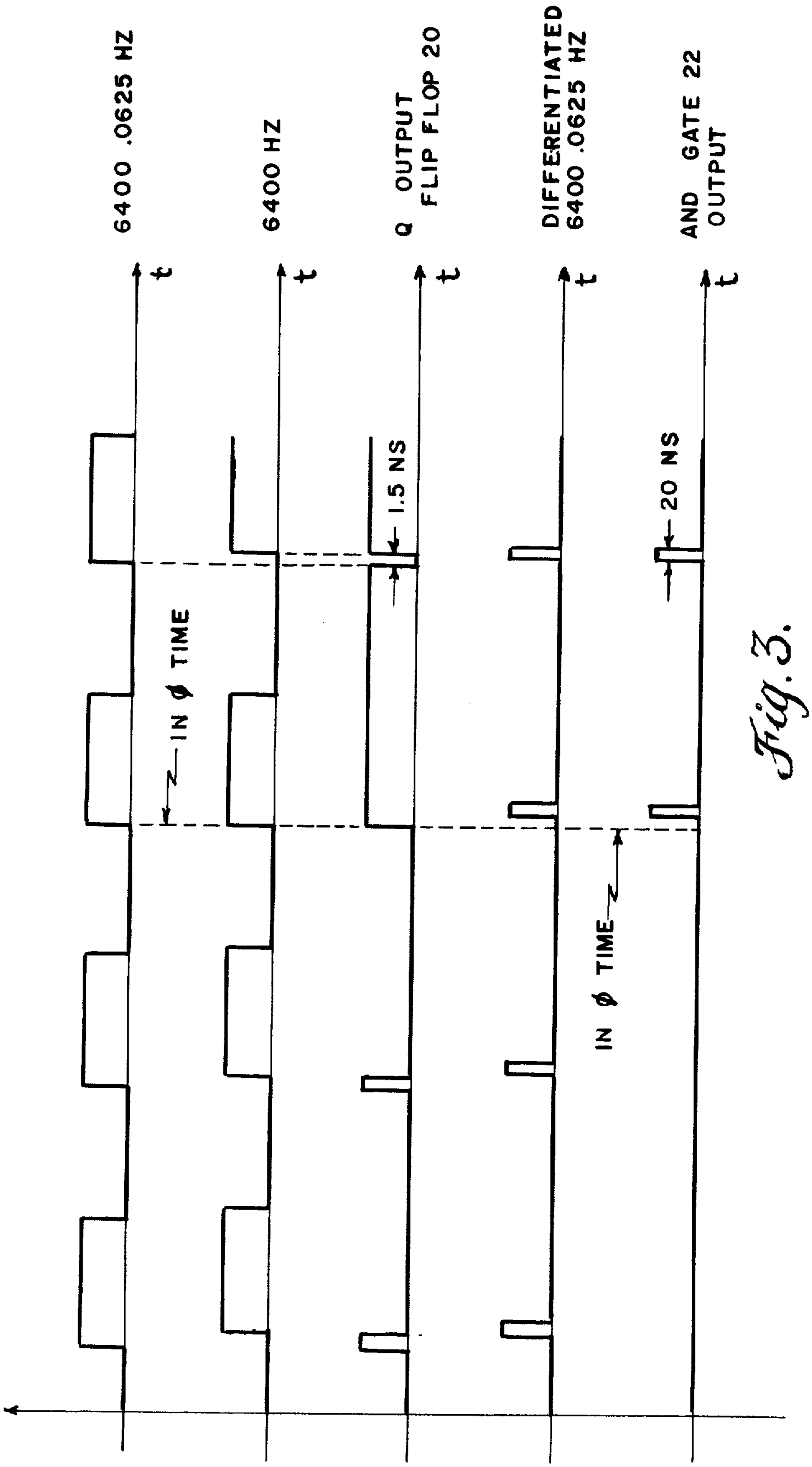

Waveforms in FIG. 3 illustrate the timing sequence to provide the in-phase pulse at the output of gate 22. The differentiated output of divider 12 is gated with the Q output of flip-flop 20. The output from gate 22 is a sequence of pulses which commence at the in-phase period of the two frequencies 6,400 Hz. and 6,400.0625 Hz. The pulses from gate 22 are 20 nanoseconds wide (due to differentiator time constants) and as the time differential between the two frequencies is approximately 20 nanoseconds after 13 periods following the in-phase period, there are therefore approximately 13 pulses appearing at the output of gate 22.

Figure 4:
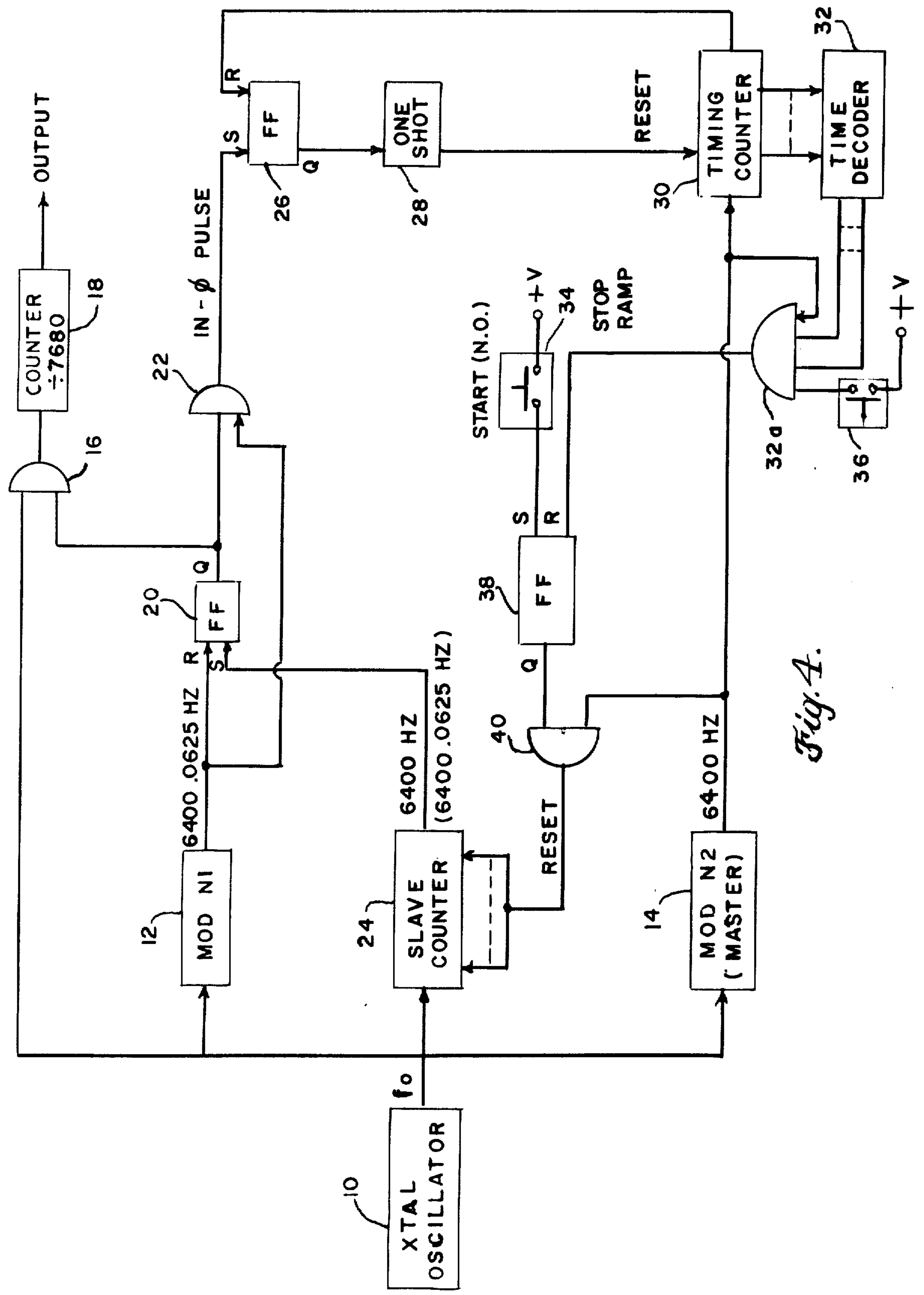
FIG. 4 is another embodiment of the ramp generator according to the invention.

Referring to FIG. 4 wherein parts already indicated in FIG. 1 are numbered identically, an additional feature of the invention is the implementation of logic to provide synthesized frequencies at 0.833 Hz. steps throughout the ramp frequency spectrum. This is accomplished by stopping the sweep generator ramp at any predetermined time during the 16 second frequency sweep. The timing logic is synchronized by the in-phase pulse generated at the output of gate 22.

As the instantaneous frequency during the 16 second ramp period is proportional to the mark to space ratio of the coincidence flip-flop 20 it follows that a constant mark to space ratio would provide a constant or nonvarying frequency.

Figure 5A:
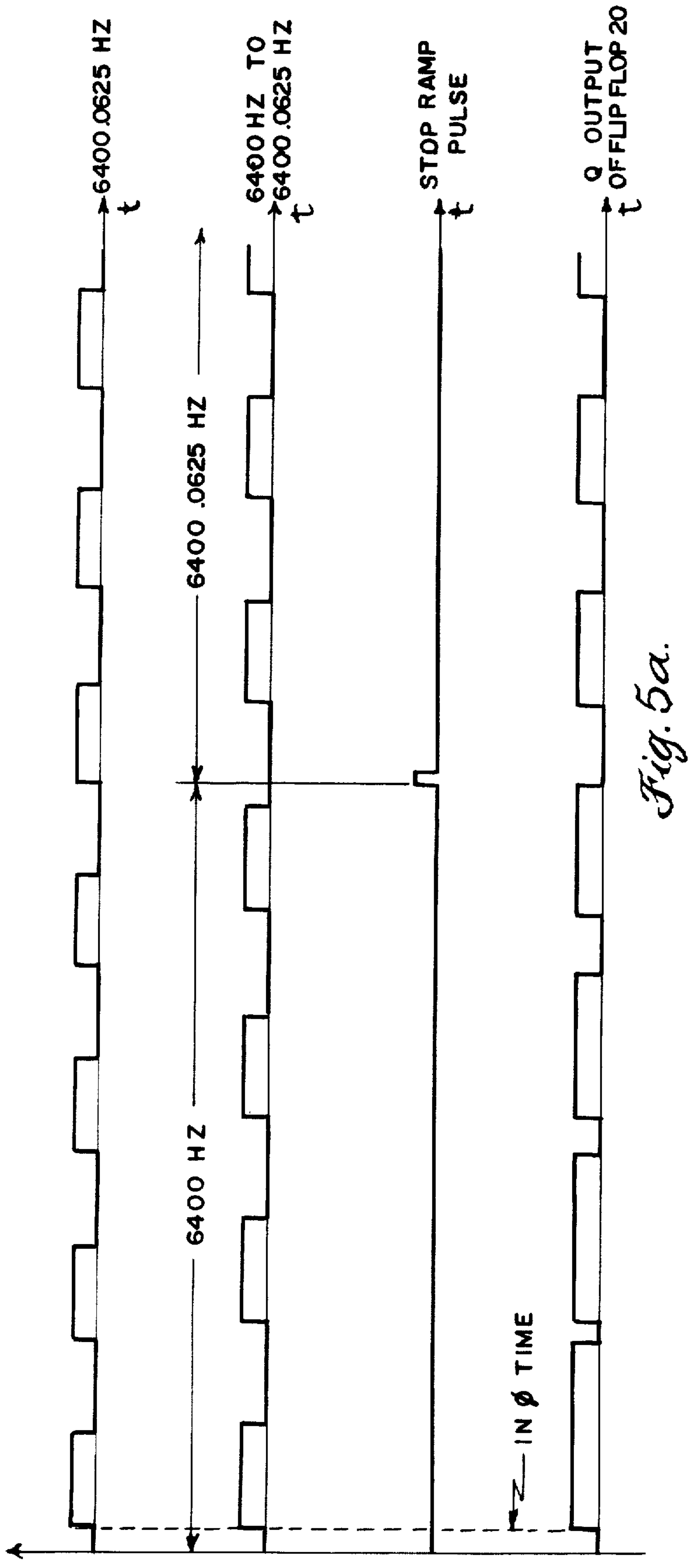
FIGS. 5A, 5B and 5C are typical timing diagrams applicable to portions of the embodiment shown in FIG. 4.

In order to stop the ramp at a preselected frequency, the normal 6,400 Hz input to coincidence flip-flop 20 is caused to change frequency to 6400.0625 Hz. with no phase discontinuity at a preselected instant in time during the 16 second sweep. This process is illustrated in FIG. 5*a* which shows that the mark to space ratio of the coincidence flip-flop 20 (i.e., the Q output) has a decreasing value after phase coincidence of the two input frequencies. When a stop ramp signal appears, the 6,400 Hz. generator switches to 6400.0625 Hz. and the mark to space ratio thereafter remains constant. The output frequency remains constant at the value proportional to the mark to space period at the stop ramp time.

Referring to FIG. 4, the logic for stopping the ramp includes a slave counter 24, having a differentiated and negatively clipped output, which normally generates a frequency of 6,400.0625 Hz. However the slave counter 24 is arranged such that all the counter stages of the slave counter 24 are reset to zero when the output of the mod $N_2$ divider 14 goes to zero. The output frequency of the slave counter 24 is therefore 6,400 Hz. when it is being reset by divider 14 which acts as a master counter vis-a-vis the slave counter 24.

When a momentary action start ramp switch 34 and associated pulse shaping logic is actuated, a short duration pulse is provided to the set input of flip-flop 38 and the Q output of flip-flop 38 goes high to thereby gate reset pulses from divider 14 to slave counter 24 via gate 40. The frequency of the slave counter 24 is 6,400 Hz. in this mode, and as the slave is fed to the set input of coincidence flip-flop 20 normal ramp operation is achieved. The in-phase pulse from gate 22 generates a reset pulse for a timing counter 30 via flip-flop 26 and one shot 28. When a stop ramp switch 36 and associated pulse shaping logic is actuated, a pulse generated from a time decoder 32 resets flip-flop 38 via gate 32*a* to thereby close gate 40 and prevent reset pulses from reaching the slave counter 24. Without reset pulses the slave counter 24 reverts to its normal counting frequency of 6400.0625 Hz. The Q output of the coincidence flip-flop 20 will now have a constant mark to space ratio since the set and reset input to flip-flop 30 are at the same frequency. The ratio represents the frequency of the ramp at the instant in time selected by the time decoder 32. The ramp may be started again by allowing the reset pulses to reach the slave counter. Flip-flop 26 is reset at the stop ramp time or at any other convenient time thereafter or by any suitable means such as by using an output from one of the stages of timing counter 30 in conjunction with conventional gating means.

Figure 5B:
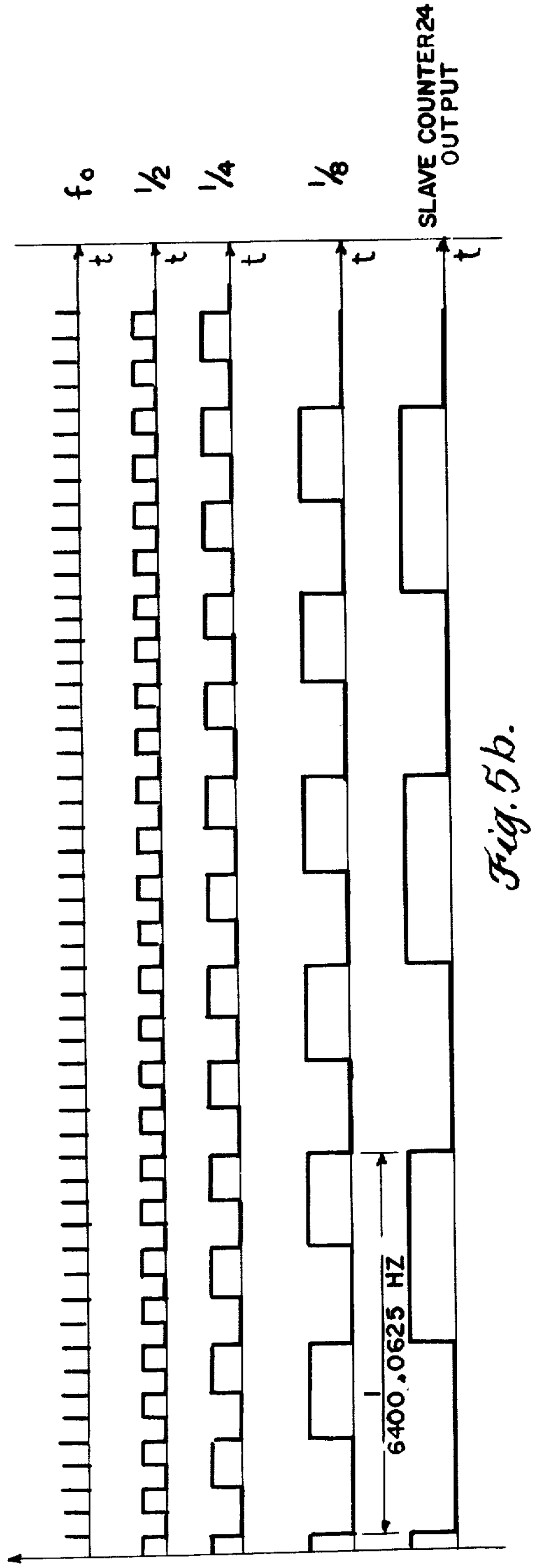
Figure 5C:
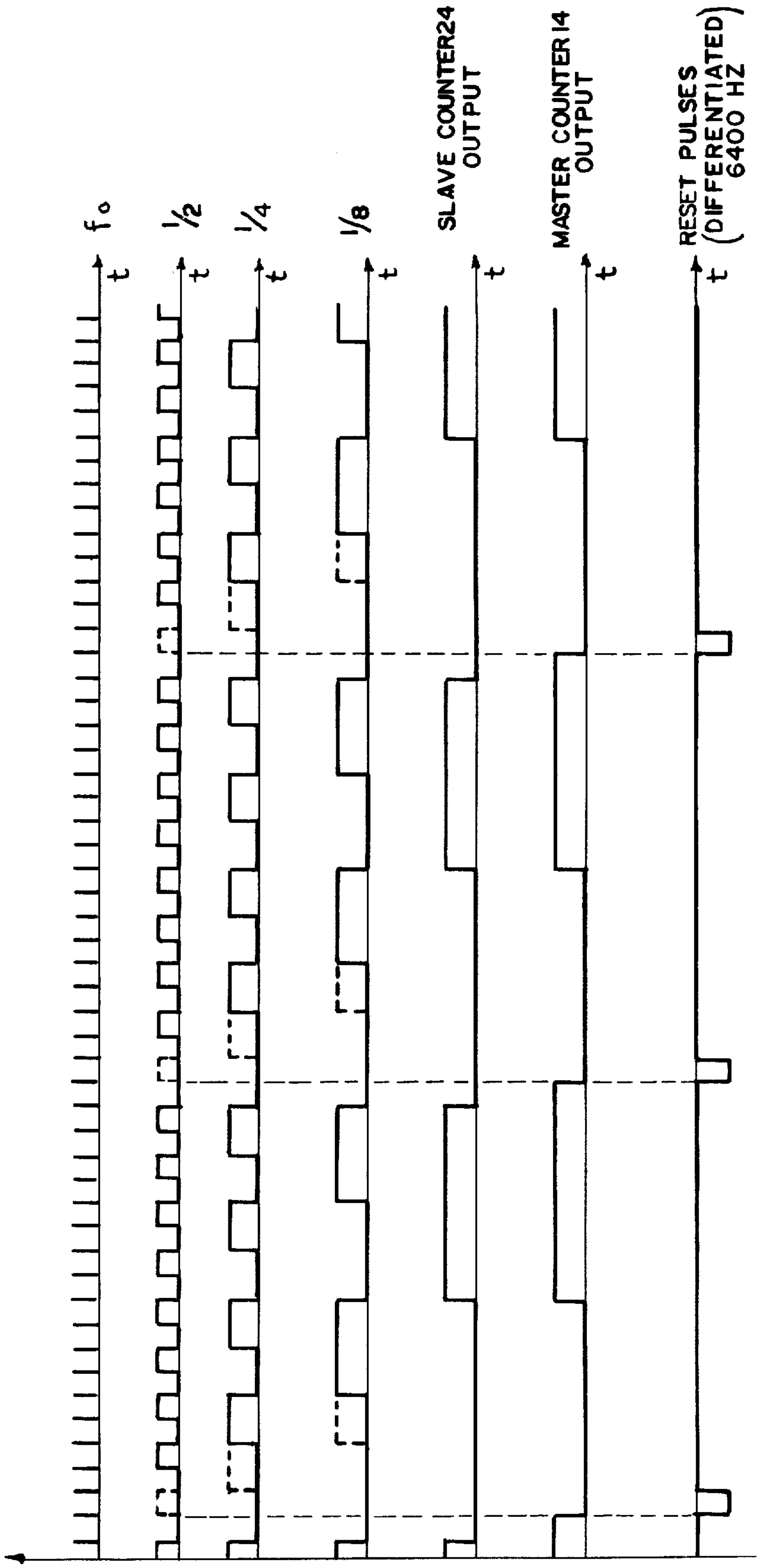

The process of ramp stopping is illustrated in FIGS. 5*b* and 5*c*. For simplicity of presentation the waveforms show only four stages of counters in the division ratio to obtain the output frquencies of 6,400 Hz. and 6400.0625 Hz. FIG. 5*b* shows normal counter operation of the slave counter 24 to obtain a frequency of 6400.0625 Hz. FIG. 5*c* shows the counter stages of the slave counter 24 being reset at each trailing edge of the master 6,400 Hz. counter 14. The effect of the reset pulse is to delay the counting sequence of the slave counter 24 by a time delay proportional to the number of clock periods which are contained in the time difference between the rising edges of the master 14 and slave 24 counter outputs. For a clock frequency of approximately 50 MHz (equal to a period of 20 nanoseconds) and output frequencies of 6,400 Hz. and 6400.0625 Hz. there are approximately 13 periods of the output frequency producing a time difference equal to the clock period. Therefore the output of the slave counter 24 will be delayed by one clock period after 13 periods of the master counter 14 output frequency. The average frequency of the slave counter 24 integrated over 13 output frequency periods will be the same as the master counter 14 output frequency. Since the frequency counts are resolved to the accuracy of the master clock 10 frequency, averaging over 13 periods of the output frequency does not degrade the frequency resolution.

Figure 5D:
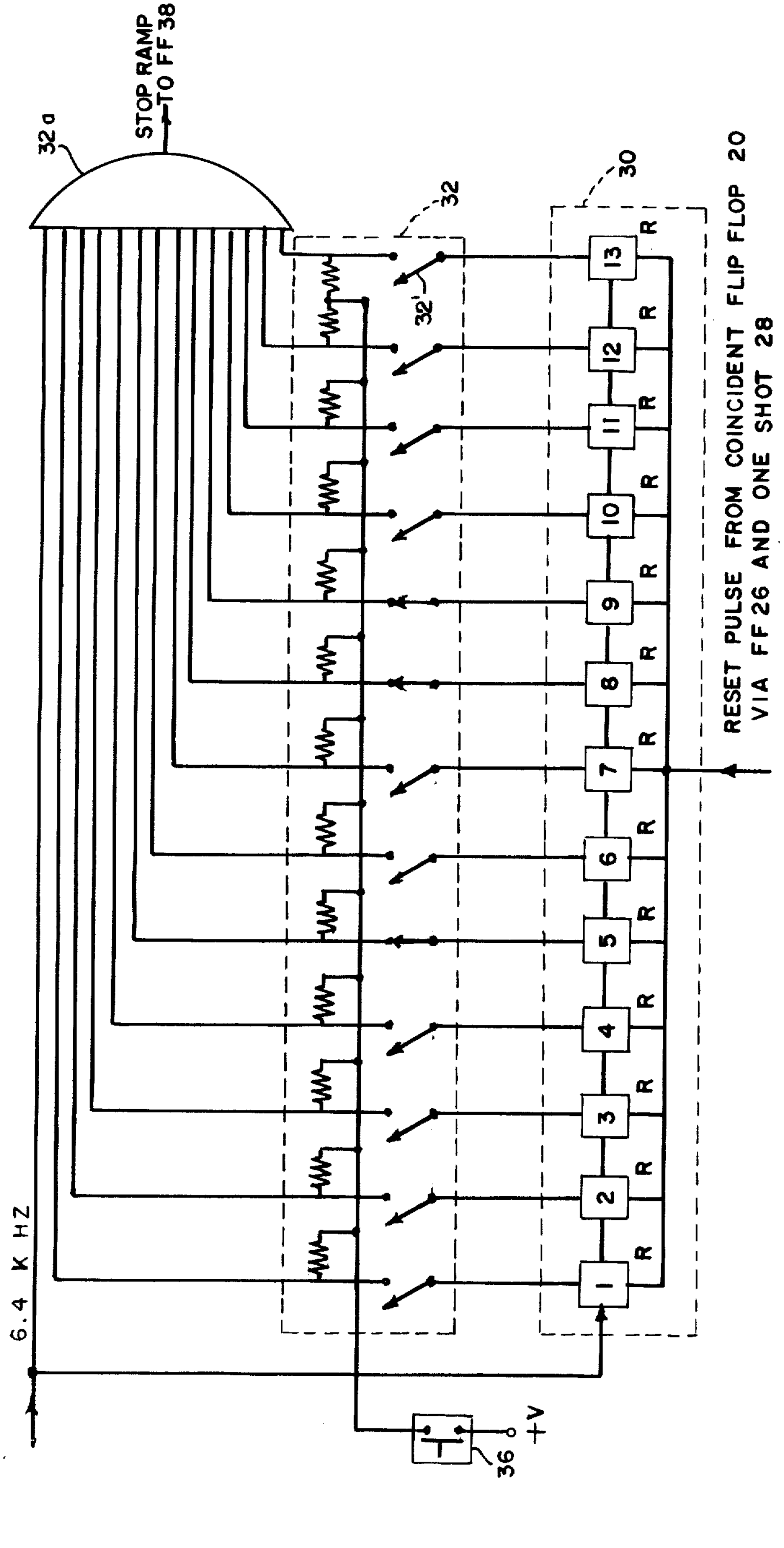
FIG. 5D is a detailed logic diagram of a portion of the embodiment shown in FIG. 4.

The process of generating the stop ramp signal is further illustrated in FIG. 5*d*. A 13 stage timing counter 30 times the instant when the stop ramp pulse occurs. The input to the counter is the frequency of 6.4 KHz. The thirteen stage timing counter 30 accomodates in 1 Hz. increments a preselected count (set in by manual switches 32' associated with time decoder 32) between 0 and 6.4 KHz. The timing counter 30 is reset to the all zero state by the in-phase pulse derived from gate 22. The in-phase pulse represents the time at which the 6,400 and 6400.0625 frequencies are in-phase, i.e., the start of the sixteen second sweep time.

The output of each stage of the timing counter 30 is switched to the decoding logic in the time decoder 32, consisting of appropriate decoding switches 32'. This is shown in FIG. 5*d* which indicates the decoding switches closed for an 800 Hz. output, for example. A fourteen input gate 32*a* decodes $2^9 + 2^8 + 2^5 = 512 + 256 + 32 = 800$. The output pulse from the gate 32*a* provides the stop ramp pulse for switching the slave counter from 6,400 Hz. to 6400.0625 Hz.

Figure 6:
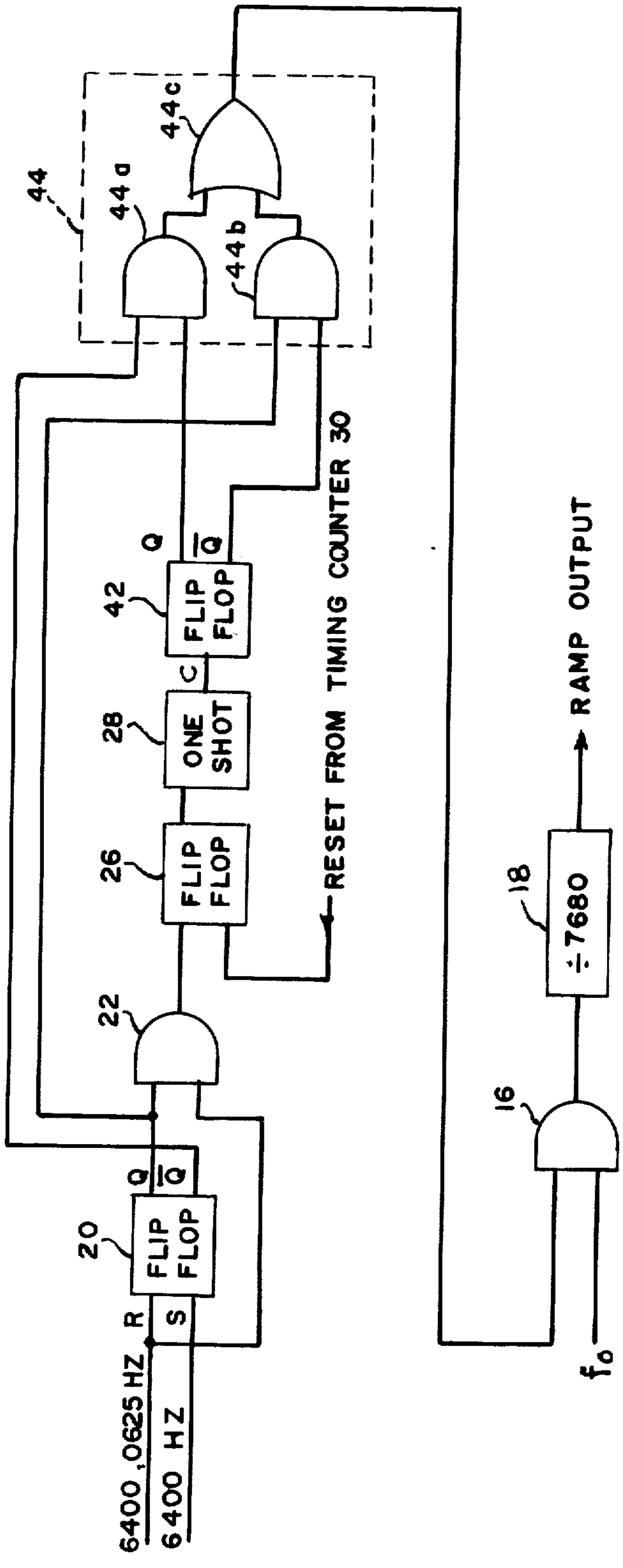
FIG. 6 is still another embodiment of the ramp generator according to the invention.

Referring to FIG. 6 wherein parts already indicated in FIGS. 1 and 4 are numbered identically, an additional feature of the invention is the implementation of ramp reversal logic. Ramp reversal is implemented by reversing the phase of the coincidence flip-flop 20 at the in-phase period of the 6,400 Hz. and 6,400.0625 Hz. frequencies. The in-phase pulse at the output of gate 22 clocks flip-flop 42 via flip-flop 26 and one shot 28. The true (Q) and complimentary ($\bar{Q}$) outputs of flip-flop 42 are fed to a changeover switch 44 which includes AND gates 44*a* and 44*b* which feed OR gate 44*c*. Changeover switch 44 effects ramp reversal by alternately switching the true (Q) and complimentary ($\bar{Q}$) outputs of coincidence flip-flop 20 to gate 16. Reference to FIGS. 2*a* and 2*b* will show that at the end of a 16 second ramp period the mark/space ratio is at a minimum indicating 0 Hz. frequency. At the in-phase period the mark/space ratio switches to a maximum indicating a frequency of 6.4 KHz. When the compliment of coincidence flip-flop 20 is switched to gate 16 at the in-phase time, the mark/space ratio commences at a minimum and increases to a maximum. At the following sixteen second in-phase time, the true output, Q, of coincidence flip-flop 20 will switch to gate 16 providing a mark/space ratio commencing at a maximum and decreasing to a minimum. A ramp is thus obtained sweeping from 0 to 6.4 KHz in sixteen seconds followed by a sweep from 6.4 KHz to 0 Hz. in the next 16 seconds. As before, flip-flop 26 is reset at any convenient time after the in-phase time.

Figure 7:
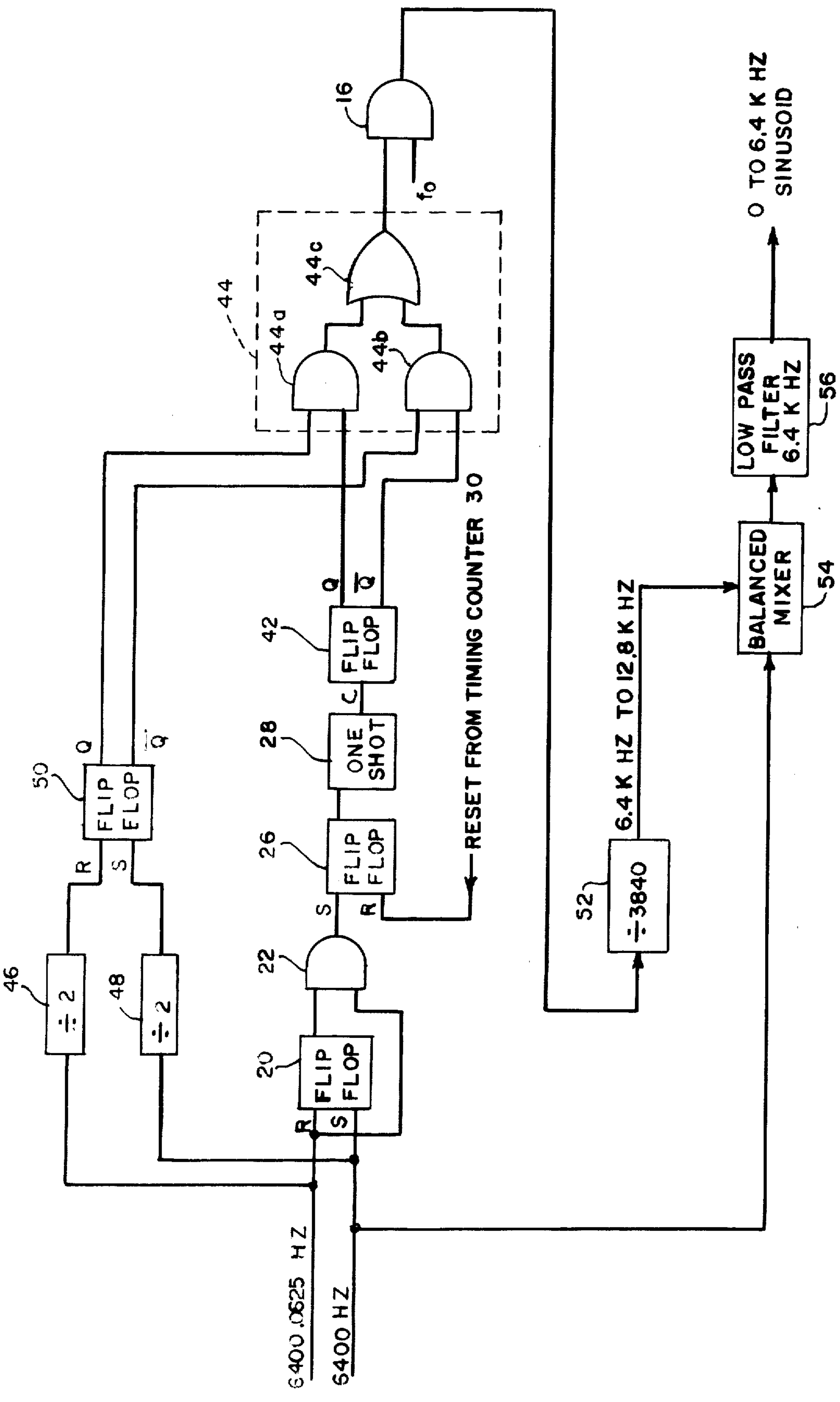
FIG. 7 is still another embodiment of the ramp generator according to the invention.

Referring to FIG. 7 wherein parts already indicated in FIGS. 1, 4 and 5 are numbered identically, an additional feature of the invention is the addition of logic to convert the squarewave base-band to a sinusoidal form. The fundamental frequencies of 6,400.0625 Hz. and 6,400 Hz. are divided by a factor of two in dividers 46 and 48 respectively to provide 3,200.03125 Hz. and 3,200 Hz. These two frequencies reset and set flip-flop 50 respectively to produce a 32 second ramp. When the selected output of flip-flop 50 is gated with the 49 MHz signal ($f_o$) from crystal oscillator 10 in gate 16 and divided by 3,840 in divider 52 a frequency ramp is obtained with a maximum frequency of 12.8 KHz. When the 32 second ramp has swept for 16 seconds the output of flip-flop 50 has an equal mark to space ratio and the frequency at the output of divider 52 is 6.4 KHz. If the complement of flip-flop 50 is switched by change-over switch 44 to gate 16 at this time the ramp will sweep up to 12.8 KHz. The timing signal for the switch is obtained from the 16 second coincidence flip-flop 20 via flip-flop 26, one shot 28 and flip-flop 42. (Flip-flop 26 is reset at any convenient time after the in-phase time as before). The output of gate 44c therefore exhibits a mark to space ratio commencing at maximum and decreasing to 50% for 16 seconds followed by an increasing mark to space ratio to maximum for 16 seconds. The squarewave output of divider 52 is fed to a balanced mixer 54. The ramp is mixed with 6,400 Hz. and subsequently filtered in a low-pass filter 56 to produce a sine wave varying from 0 to 6.4 KHz.

Obviously, many modifications and variations of the present invention are possible in the light of the above teachings. It is therefore to be understood that within the scope of the appended claims the invention may be practiced otherwise than as specifically described.

I claim:

1. A sweep frequency generator comprising:
oscillator means for producing clock pulses;
first means responsive to said clock pulses for producing a first output signal with a first repetition rate;
second means responsive to said clock pulses for producing a second output signal with a second repetition rate;
third means responsive to the output signals of said first and second means for producing a third output signal representing the phase difference between said first and second output signals; and
fourth means responsive to the output signal of said third means and to said clock pulses for producing a fourth output signal having a repetition rate proportional to the output signal of said third means.

2. A sweep frequency generator according to claim 1 wherein:
said first means includes a counter of predetermined length providing counted clock pulses to a first differentiator;
said second means includes an AND gate and a first counter arranged in a loop wherein said AND gate is responsive to said clock pulses and to the output of said first counter; and
said second means further includes a second counter responsive to the output of said AND gate for providing signals to a second differentiator,

3. A sweep frequency generator according to claim 2 wherein:
said third means includes a flip-flop; and
said fourth means includes an AND gate responsive to an output of said flip-flop and to said clock pulses.

4. A sweep frequency generator according to claim 3 wherein:
said fourth means further includes a counter of predetermined length responsive to the output of said AND gate.

5. A sweep frequency generator according to claim 1 further including:
gate means responsive to the output of said first means and to the output of said third means for producing a signal when the output of said first means and the output of said third means occur concurrently.

6. A sweep frequency generator, repeatedly producing an output sweeping from a first frequency to a second frequency during a sweep period and further including provisions for continuously maintaining the output at said first or second frequency or at some predetermined frequency intermediate said first and second frequencies, comprising:
oscillator means for producing clock pulses;
first means responsive to said clock pulses for producing a first output signal having a first repetition rate;
second means responsive to said clock pulses for producing a second output signal having a second repetition rate;
slave reset means for selectively producing a slave reset pulse at a predetermined time during said sweep period between said first and second frequencies;
third means responsive to said clock pulses and to said slave reset pulse for producing a third output signal having a repetition rate equal to said second output signal when said slave reset pulse is present and having a repetition rate equal to said first output signal when said slave reset pulse is absent;
fourth means responsive to the output signals of said first and third means for producing a signal representing the phase difference between said first and third output signals; and
fifth means responsive to the output signal of said fourth means and to said clock pulses for producing a baseband signal having a repetition rate proportional to the output signal of said fourth means.

7. A sweep frequency generator according to claim 6 wherein said slave reset means includes:
first generator means responsive to the output signal of said first means and to the output signal of said fourth means for generating an in-phase pulse;
second generator means responsive to said in-phase pulse for generating a counter reset pulse;
timing counter means responsive to said counter reset pulse and to the output signal of said second means for generating a plurality of timing outputs;
selector means operatively connected to said timing counter means for selecting one or more of said plurality of timing outputs and for producing a stop ramp pulse as a logical function of said selection; and
third generator means responsive to said stop ramp pulse for generating said slave reset pulse.

8. A sweep frequency generator according to claim 7 wherein said third generator means includes:
a flip-flop having a Q output;
a start switch means for providing a signal to the set input of said flip-flop upon actuation;
a stop switch means for providing said stop ramp pulse to the reset input of said flip-flop upon actuation; and
gate means responsive to the Q output of said flip-flop and to the output signal of said second means for producing said slave reset pulse and for providing same to said third means.

9. A sweep frequency generator, for repeatedly producing a triangular sweep from a first frequency to a second frequency and thence returning to the first frequency, comprising:

oscillator means for producing clock pulses;

first means responsive to said clock pulses for producing a first output signal having a first repetition rate;

second means responsive to said clock pulses for producing a second output signal having a second repetition rate;

third means responsive to the output signals of said first and second means for producing an output signal, Q, representing the phase difference between said first and second output signals and for producing an output signal $\bar{Q}$ representing the inverse of said Q signal;

fourth means responsive to said signala Q and to said first output signal for producing a plurality of control signals wherein each of said plurality of control signals is produced when said signal Q and said first output signal occur concurrently;

fifth means responsive to each of said plurality of control signals for producing mutually exclusive changeover signals A and $\bar{A}$;

sixth means responsive to said signals Q, $\bar{Q}$, A and $\bar{A}$ for producing a gate signal; and seventh means responsive to said gate signal and to said clock pulses for producing a baseband output signal having a repetition rate proportional to said gate signal.

10. A sweep frequency generator according to claim 9 wherein said fifth means includes:

a first flip-flop having a set input responsive to each of said plurality of control signals and having a reset input responsive to a reset signal;

a monostable multivibrator responsive to one output of said first flip-flop;

a second flip-flop having a clocking input responsive to the output of said monostable multivibrator and producing said mutually exclusive changeover signals A and $\bar{A}$; and reset means for producing said reset signal a predetermined time after each of said plurality of control signals.

11. A sweep frequency generator according to claim 10 wherein said sixth means includes:

a first AND gate means responsive to said signal $\bar{Q}$ and said signal A for producing a signal X representing the logical AND product of said signals $\bar{Q}$ and A;

a second AND gate means responsive to said signal Q and said signal $\bar{A}$ for producing a signal Y representing the logical AND product of said signals Q and $\bar{A}$; and OR gate means responsive to said signal X and to said signal Y for producing said gate signal.

12. A sweep frequency generator according to claim 11 wherein:

said first means includes a counter of predetermined length providing counted clock pulses to a first differentiator;

said second means includes an AND gate and a first counter arranged in a loop wherein said AND gate is responsive to said clock pulses and to the output of said first counter; and said second means further includes a second counter responsive to the output of said AND gate for providing signals to a second differentiator.

13. A sweep frequency generator for producing a sinusoidal output signal comprising:

oscillator means for producing clock pulses;

first means responsive to said clock pulses for producing a first output signal having a first repetition rate;

second means responsive to said clock pulses for producing a second output signal having a second repetition rate;

third means responsive to the output signals of said first and second means for producing a third output signal representing the phase difference between said first and second output signals;

fourth means responsive to said third output signal and to said first output signal for producing a plurality of control signals wherein each of said plurality of control signals is produced when said third output signal and said first output signal occur concurrently;

fifth means responsive to each of said plurality of control signals for producing mutually exclusive changeover signals A and $\bar{A}$;

sixth means responsive to said first output signal for producing an output signal having a third repetition rate proportional to said first repetition rate;

seventh means responsive to said second output signal for producing an output signal having a fourth repetition rate proportional to said second repetition rate;

eighth means responsive to the output signals of said sixth and seventh means for producing an output signal Q representing the phase difference between the output signals of said sixth and seventh means and for producing an output signal $\bar{Q}$ representing the inverse of said output signal Q;

ninth means responsive to said signals Q, $\bar{Q}$, A and $\bar{A}$ for producing a gate signal;

tenth means responsive to said gate signal and to said clock pulses for producing an output signal having a repetition rate proportional to said gate signal;

eleventh means responsive to the output of said tenth means and to said second output signal for converting the output of said tenth means to a sinusoidal form.

14. A sweep frequency generator according to claim 13 wherein said fifth means includes:

a first flip-flop having a set input responsive to each of said plurality of control signals and having a reset input responsive to a reset signal;

a monostable multivibrator responsive to one output of said first flip-flop;

a second flip-flop having a clocking input responsive to the output of said monostable multivibrator and producing said mutually exclusive changeover signals A and $\bar{A}$; and reset means for producing said reset signal a predetermined time after each of said plurality of control signals.

15. A sweep frequency generator according to claim 14 wherein said ninth means includes:

a first AND gate means responsive to said signal $\bar{Q}$ and said signal A for producing a signal X representing the logical AND product of said signals $\bar{Q}$ and A;

a second AND gate means responsive to said signal Q and said signal $\bar{A}$ for producing a signal Y representing the logical AND product of said signals Q and $\bar{A}$; and OR gate means responsive to said signal X and to said signal Y for producing said gate signal.

16. A sweep frequency generator according to claim 15 wherein:

said first means includes a counter of predetermined length providing counted clock pulses to a first differentiator;

said second means includes an AND gate and a first counter arranged in a loop wherein said AND gate is responsive to said clock pulses and to the output of said first counter; and said second means further includes a second counter responsive to the output of said AND gate for providing signals to a second differentiator.

17. A sweep frequency generator according to claim 16 wherein said eleventh means includes:

a balanced mixer; and a low-pass filter responsive to the output of said balanced mixer.

* * * * *